July 12, 1966 J. B. BARKER ETAL 3,260,420
MOTOR DRIVEN ROTARY DISPENSING VALVE
Filed July 28, 1964 3 Sheets-Sheet 1

Inventors
John B. Barker
Geoffrey R. Davee
By Attorneys
Klein & Pollen

United States Patent Office 3,260,420
Patented July 12, 1966

3,260,420
MOTOR DRIVEN ROTARY DISPENSING VALVE
John Bentley Barker, Thurmaston, and Geoffrey Roy Dence, London, England, assignors to Richards Structural Steel Company Limited, Phoenix Iron Works, Leicester, England
Filed July 28, 1964, Ser. No. 385,578
10 Claims. (Cl. 222—333)

This invention is for improvements in or relating to rotary valves and has for one of its objects to provide a compact and economical form of construction for a valve which is required to be rotated continuously. Such a valve may be used for example at the bottom of the coned lower end of a hopper for the purpose of delivering powdered or granular material therefrom.

In accordance with the invention there is provided a rotary valve comprising a cylindrical shell having circumferentially spaced vanes projecting therefrom, an electrical driving motor mounted within the shell and supported from one end thereof, and reduction gearing coupling the motor to the said shell, said gearing being also contained within the shell. By this form of construction a simple, compact and effective motorised valve is provided suitable for use in dealing with powdered or granular material in delivering it from a container or hopper.

In a convenient construction the rotary valve comprises a cylindrical casing having flanged inlet and outlet passages extending therefrom with the rotary shell of the valve supported within the cylindrical casing and mounted at its ends by means of bearing so that it can rotate with the vanes just clear of peripheral contact with the internal surface of the casing. The vanes may extend between end flanges which reach outwardly to the cylindrical internal surface of the casing and may engage seals if required and serve to close the ends of compartments formed between succeeding vanes. The mounting of the rotary part of the valve is conveniently provided by having an end cap fitted to the shell at one end so as to rotate therewith and provided with an outwardly projecting central spindle fitted in an anti-friction bearing carried by the casing. At the other end the shell is mounted to rotate on a fixed stem projecting into it from the other end of the casing and carrying an anti-friction bearing between it and a disc-like closure part at the other end of the shell.

In a convenient construction the electric motor employed for driving the rotary part of the valve is of a kind requiring no external connections for energising its rotor and the motor is mounted by means of its stationary part or stator from one end by stationary central spindle conveniently provided by the fixed item aforesaid. A suitable motor for use as the driving motor is an alternating current induction motor, for example a three-phase squirrel cage motor.

The foregoing and other provisions of the invention are incorporated in a convenient form of construction which is illustrated by way of example in the accompanying drawings and will now be described with reference to the drawings, in which.

Figure 2:
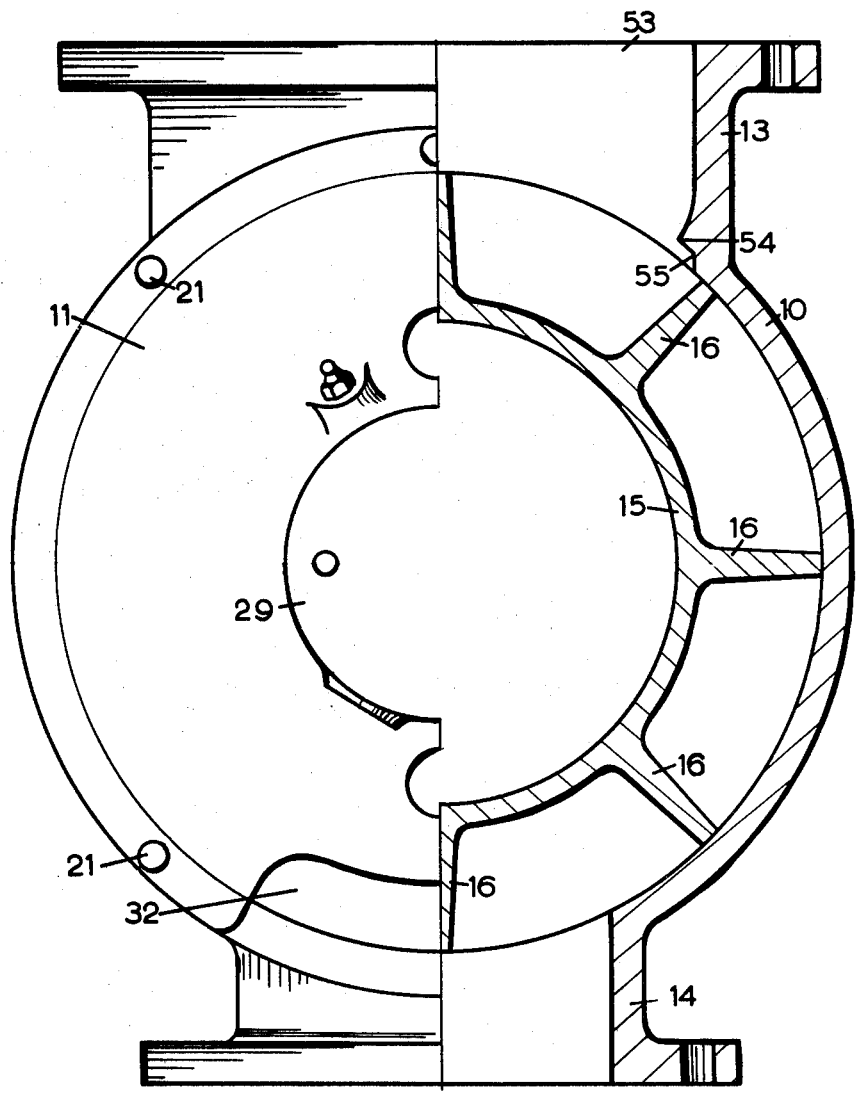
FIGURE 2 is an end elevation of the valve shown in FIGURE 1 partly in outside view and partly in cross-section but omitting the motor and drawn to a scale larger than that of FIGURE 1.

The rotary valve illustrated in the drawings comprises a casing 10 of cylindrical form fitted with end caps 11 and 12 and having a flanged hollow input neck at its upper part and a flanged hollow delivery piece 14 at its lower part, see particularly FIGURE 2. Within the hollow cylindrical case 10 there is rotatably mounted a rotary shell 15 of cylindrical form fitted with external vanes 16 extending between end flanges 17 and 18 which reach outwardly to the cylindrical internal surface of the casing 10 and serve to close the end of compartments formed between succeeding vanes 16. The vanes 16 and end flanges 17 and 18 have a close sliding fit against the machined internal surface of the casing 10. The valve is adapted to be positioned at the bottom of a tapering base of a hopper for delivering powdered or granular material, the flanged neck 13 being connected to the bottom of the hopper and the flanged delivery piece 14 being connected to a delivery conduit or alternatively serving itself as a discharge outlet. The rotary part of the valve consisting of the shell 15, vanes 16 and end flanges 17 and 18 is arranged to be driven by an electric motor indicated generally at 19 and contained within the shell 15. The motor drives the shell through a reduction gearing indicated generally at 20. As the rotary part of the valve turns, the vanes 16 are moved in succession past the inlet opening in the neck 13 and abstract powdered or granular material therefrom. Such material is carried round by the vanes and deposited gravitationally through the outlet opening in the delivery piece 14.

The end caps 11 and 12 are fixed circumferentially to the casing 10 by bolts indicated at 21 and 22. The end cap 12 is centrally apertured to receive a bearing 23 of a spindle 24 which projects from an end cap 25 fitted to one end of the shell 15 and is secured thereto by bolts 26. The shell 15 is thereby rotatably supported at its end adjacent to the cap 12. The end cap 11 at the other end of the casing carries a central boss 27 forming a mounting for a fixed hollow stem 28 keyed to the boss and projecting from the other end of the shell 15 and also for a connection box 29 for connections extending from the motor 19. The stem 28 supports a bearing 30 on which the end of the shell 15 adjacent to the end cap 11 is rotatably mounted. The bearing 30 is interposed between the stem 28 and a centrally apertured end wall or internal flange 31 of the shell 15. The end caps 11 and 12 have ventilating slots 32 and 33 formed in their lower parts which serve also to permit escape of any material which may escape over the flanges 17 and 18 and might otherwise jam the valve.

The electric motor 19 used for driving the valve is a three-phase squirrel cage motor which requires no external connections for energising its rotor. It has a fixed external stator 34 which is energised through leads 35 extending through the hollow stem 28 in the connection box 29, the stator being mounted on a frame 36 which comprises an end plate 37 which is attached to or formed integrally with the stem 28 and presents inwardly a boss 38 supporting a bearing 39 for one end of the rotor spindle 40 of the motor. The other end of the rotor spindle is carried in a bearing 41 supported by the other end plate 42 of the stator frame. On this end of the rotor spindle 40 there is secured to it a disc 43 to which is fixed an eccentric stub spindle 44 carrying a compound pinion gear 45, 46 which can rotate freely on anti-friction bearings 47 on the stub spindle. Projecting from the end of the eccentric stub spindle 44 is a short spindle end 48 concentric with the rotor spindle 40 and rotating in a bearing 49 fitted internally in a recess in the end cap 25.

Figure 4:
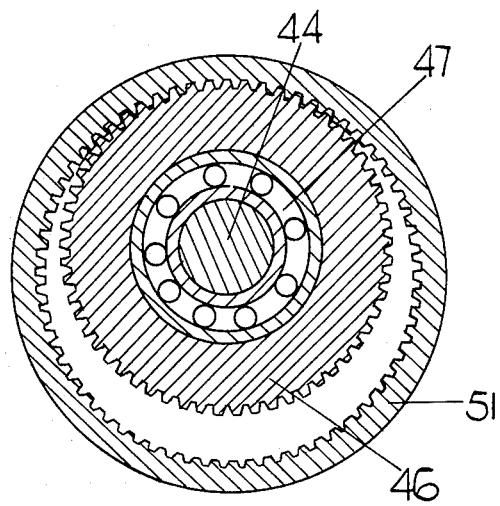
FIGURES 4 and 5 are, respectively, sections along lines A—A and B—B of FIGURE 1.
Figure 5:
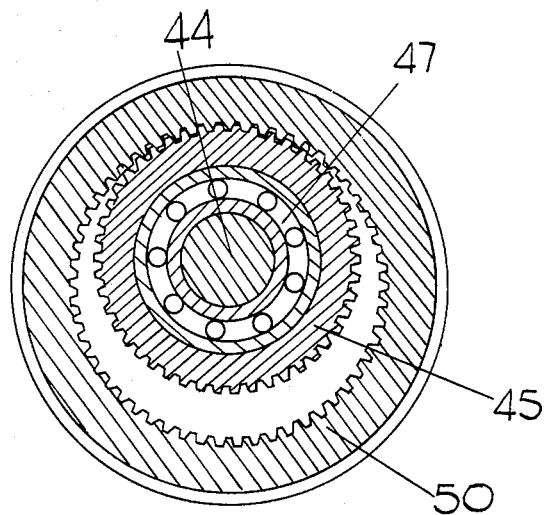

The reduction gear 20 is formed by the compound pinion gear 45, 46 and two related internal ring gears 50 and 51 (shown more particularly in FIGURES 4 and 5). The gear 50 is stationary being formed on an extension of the end plate of the stator frame of the motor 19. The ring gear 51 is formed internally on a flange 52 projecting inwardly from the end cap 25 secured to the shell 15.

When the motor 19 is in operation its rotor spindle 40 is caused to rotate and cause the eccentric stub spindle 44 to move around a circle causing the parts 45 and 46 of the compound pinion gear which are integral with one another to roll around in mesh respectively with the gear teeth on the ring gears 50 and 51 which are of larger diameter than the parts of the compound pinion gear. The ring gears 50 and 51 are of somewhat different diameters and have different numbers of teeth so that the rolling engagement of the part 45 of the compound pinion gear with the fixed ring gear 50 causes the compound pinion to rotate on its eccentric stub spindle 44 and thereby rotate the part 46 of the pinion and cause the ring gear 51 to be rotated to drive the shell 15 through the end cap 25. By suitable choice of the relative sizes of the parts of the compound pinion and the relative sizes and numbers of teeth in the ring gears, any appropriate speed reduction can be secured in the drive from the rotor spindle 40 to the shell 15. By this form of reduction gear a very considerable reduction ratio can be secured in a gear having extreme compactness.

To assist in avoiding the possibility of foreign matter or lumps in the material being delivered to the valve having a clogging action to jam the valve as its vanes 16 pass away from the inlet opening in the neck 13, that part of the inlet opening last encountered by the ends of the vanes 16 may be modified in shape. As shown in FIG. 2, the inlet opening is indicated at 53 and the modification of shape just referred to consists in the formation of an inturned cusp-like lip 54 extending from side to side of the opening 53. This leaves only a narrow space 55 between the lip and the path of the vanes 16 which move in a clock-wise direction as seen in FIG. 2. This lip 54 tends to prevent any pieces of foreign matter or hard material becoming caught between the tips of the vanes and the edge of the inlet openings.

The interior of the shell 15 containing the motor 19 and gearing 20 is partly filled with oil to form an oil bath for the gearing and serve also as a coolant for the motor. To enable the oil to be decanted for replacement when required the internal flange 31 of the shell is fitted at a position close to its periphery with an oil draining aperture 56 fitted with a removable closure plug 57. The interior of the shell is sealed against escape of oil by means of a sealing ring 58 fitted within a small cap 59 secured to the flange 31 by screws 60 and serving to seal the outer part of bearing 30 against escape of oil. The cooling effect on the motor of the oil within the shell 15 is to some extent supplemented by the cooling effect on the shell 15 of the powdered or granular material being passed by the rotary valve.

Figure 1:
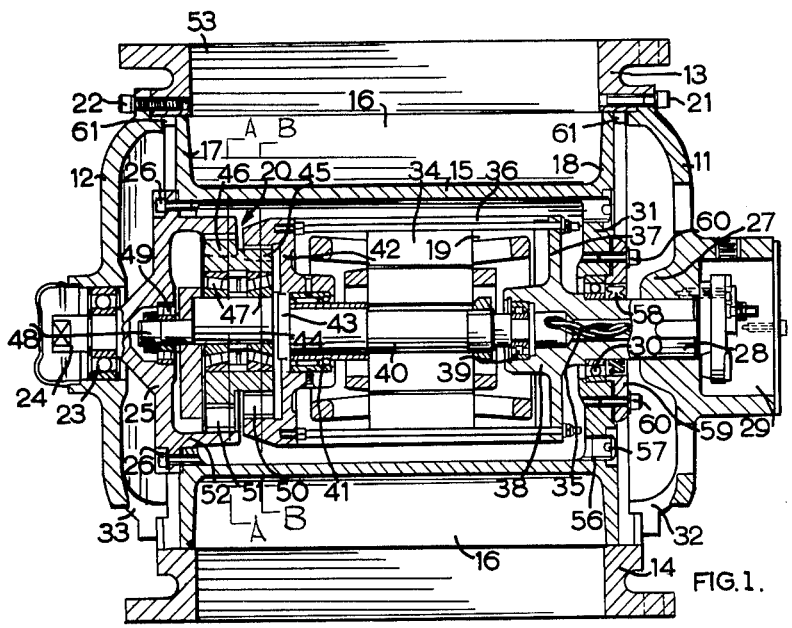
FIGURE 1 is an elevation view in central cross section of a rotary valve in accordance with the invention.
Figure 3:
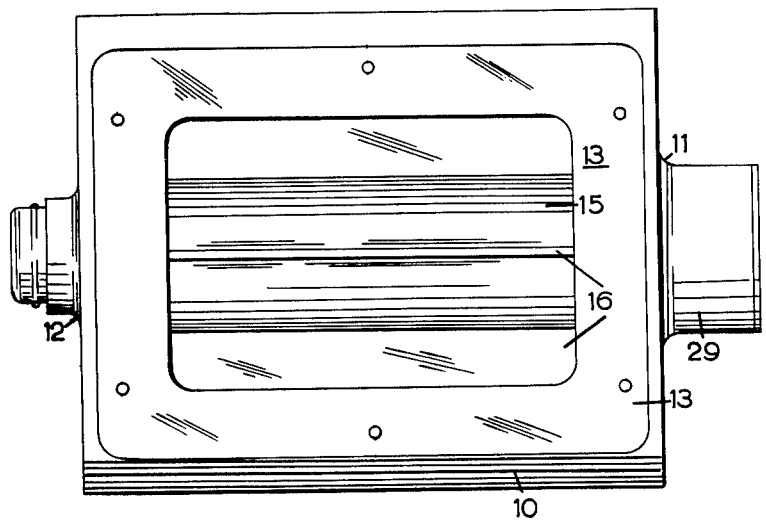
FIGURE 3 is a plan view of the valve.

In some circumstances it may be found desirable to fit sealing rings 61, FIG. 1, to bear against the peripheries of the end flanges 17 and 18 to reduce any tendency for the material passing through the valve to escape past these flanges into the end cups 11 and 12.

The improved rotary valve provided by the invention offers a number of useful advantages as compared with previous rotary valves. Thus the provision of the shell containing the motor, by providing the pockets between the vanes with relatively flat bottom walls, reduces the tendency for wedging of the material being passed by the valve in the pockets between the vanes, without materially reducing the capacity of the valve. Further the improved valve requires less space than previous rotary valves with their driving units and is much simpler to install than the earlier constructions. In addition the unit is lighter in weight than a conventional valve and drive gear, and requires less maintenance to keep it effectively in operation.

A rotary valve as described herein is particularly useful for use in a hopper of an air filter used for removing dust from dust laden air. The valve may be employed to deliver dust from such hopper.

What is claimed is:
1. In a rotary valve, the combination comprising a cylindrical shell, a cylindrical casing formed with flanged walls defining inlet and outlet passages, end flanges on the shell reaching outwardly to the cylindrical internal surface of the casing, circumferentially spaced vanes projecting from the shell and extending between said end flanges, the flanges serving to close the ends of compartments formed between succeeding ones of the vanes, bearings at the ends of the casing and supporting the rotary shell of the valve for rotation within the cylindrical casing, the shell being mounted to rotate with its vanes just clear of peripheral contact with the internal surface of the casing, an electrical driving motor, means mounting said motor within the shell and supporting the motor from one end thereof, and reduction gearing contained within the shell and coupling the motor to the shell.

2. The combination according to claim 1 having seals with which the end flanges of the shell engage outwardly.

3. In a rotary valve the combination comprising a cylindrical shell provided with circumferentially spaced vanes projecting outwardly therefrom, a casing surrounding said shell and said shell being mounted for rotation on said casing, an electrical driving motor, means mounting said motor within the shell and supporting the motor from one end thereof, reduction gearing contained within the shell and coupling the motor to the shell, an end cap fitted to the shell at one end so as to rotate therewith and provided with an outwardly projecting central spindle, an anti-friction bearing carried on the casing for mounting said central spindle, a fixed stem mounted on the casing at the opposite end thereof and projecting into the other end of the shell, and an anti-friction bearing supported by said fixed stem and forming a mounting for said other end of the shell.

4. A combination according to claim 3 having a disc-like closure part at the stem end of the shell between which and the stem the anti-friction bearing is positioned.

5. The combination of claim 1, wherein the motor has a rotor requiring no external connection for energising it and having a stator, and said motor mounting means supporting its stator from said one end.

6. A combination according to claim 5 wherein said stator supporting means comprises a stationary central spindle coupled to the stator of the motor and projecting through the adjacent end of the shell and serving to support the motor within the shell.

7. A combination according to claim 5 wherein the electrical driving motor is an alternating current induction motor.

8. In a rotary valve, the combination comprising a cylindrical shell having two ends, a casing surrounding said shell and said shell being mounted for rotation on said casing, circumferentially spaced vanes projecting from said shell, an electrical driving motor including a stationary body and an end plate fixed in relation to said body, a fixed central stem extending through one end of the shell and attached to said end plate to support the motor within the shell from one end thereof, and reduction gearing contained within the shell and coupling the motor to the shell, said reduction gearing including an internal ring gear fixed to the stationary body of the motor.

9. The combination of claim 1, further comprising means closing the cylindrical shell in a liquid-tight manner, and oil contained within said shell and serving partly as a lubricant for the moving parts and also as a coolant for the motor.

10. In a rotary valve, the combination comprising a cylindrical shell provided with circumferentially spaced vanes projecting therefrom, a casing surrounding said shell and said shell being mounted for rotation on said casing, an alternating electric current, three-phase squirrel cage driving motor having a rotor requiring no external connection for energizing it and having a stator, means mounting said motor within the shell and supporting its stator from one end thereof, and reduction gearing contained within the shell and coupling the rotor of the motor to the shell.

References Cited by the Examiner

UNITED STATES PATENTS

| | | | |
|---|---|---|---|
| 1,922,425 | 8/1933 | Evans | 222—197 X |
| 2,538,320 | 1/1951 | Mylting | 222—368 X |
| 2,594,974 | 4/1952 | Mylting. | |
| 2,905,010 | 9/1959 | Rieser. | |
| 2,938,651 | 5/1960 | Sprecht | 222—368 X |

FOREIGN PATENTS

| | | |
|---|---|---|
| 1,121,688 | 8/1956 | France. |
| 791,120 | 2/1958 | Great Britain. |

M. HENSON WOOD, Jr., *Primary Examiner.*

RAPHAEL M. LUPO, *Examiner.*

A. N. KNOWLES, *Assistant Examiner.*